July 11, 1967  J. G. WILLIAMS  3,330,513
VIBRATION ISOLATING SUPPORT STRUCTURES FOR ROTATING MACHINERY
Filed July 30, 1965  4 Sheets-Sheet 1

FIG. I

JOHN G. WILLIAMS
INVENTOR.

BY Daniel H. Bobis
Atty

July 11, 1967   J. G. WILLIAMS   3,330,513
VIBRATION ISOLATING SUPPORT STRUCTURES FOR ROTATING MACHINERY
Filed July 30, 1965   4 Sheets-Sheet 2

JOHN G. WILLIAMS
*INVENTOR.*

BY *Daniel H. Bobis*
*Atty*

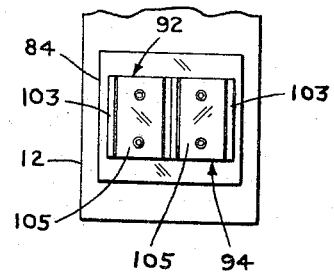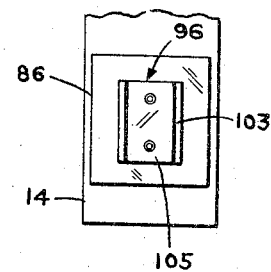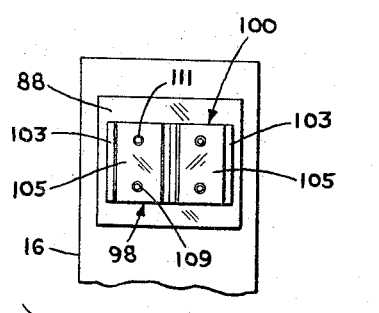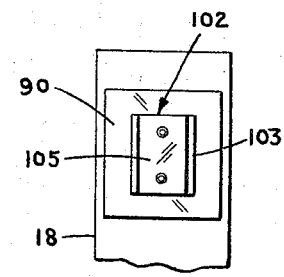
FIG. 4
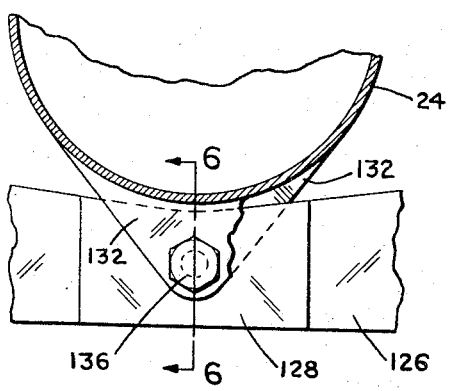
FIG. 5
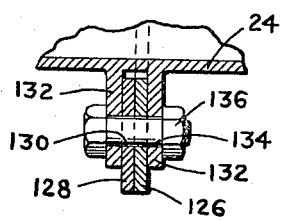
FIG. 6
JOHN G. WILLIAMS
INVENTOR.

United States Patent Office 3,330,513
Patented July 11, 1967

3,330,513
VIBRATION ISOLATING SUPPORT STRUCTURES FOR ROTATING MACHINERY
John G. Williams, Plainfield, N.J., assignor to Worthington Corporation, Harrison, N.J., a corporation of Delaware
Filed July 30, 1965, Ser. No. 476,006
10 Claims. (Cl. 248—20)

ABSTRACT OF THE DISCLOSURE

This invention relates generally to support bases and more specifically to a light weight vibration isolating support structure for rotating machinery utilized in the propulsion of naval vessels wherein spaced vessel-mounted columnar base means form the mounting surfaces for a light weight U-shaped support cradle vibrationally insulated from the columnar base means which cradle forms a three point mounting frame comprising two spaced coaxial pivotal support means attached thereto and to opposite sides of the supported machinery in a plane passing through the center of gravity of the machine with the third mounting point, being forward of the coaxial points, on the traverse flexible support member lying within the support cradle so that said flexible plate means will absorb by deformation any thermal growth of the supported machinery as well as absorb movement of the supported machinery relative its coaxial support thereby eliminating stresses within the machinery, as well as damping vibrations between support and supported members.

---

This invention relates to sound isolating support structures for rotating machinery and, more particularly but not exclusively, to sound isolating support structures for large turbo generator units which are utilized in the propulsion of naval vessels.

In many applications wherein large turbo generator units are utilized in the propulsion of naval vessels, as for example submarines, it is essential to reduce transmission of the operational vibrations of the said units to the hulls of the said naval vessels to an absolute minimum to avoid detection of the latter while, at the same time, providing sufficient strength and stiffness in the turbo generator unit support structures to resist the high shock stresses applied thereto by demanding vessel operating conditions such as rough seas and/or extreme maneuvers. The minimization of the transmission of the operational vibrations of the turbo generator units to the vessel hulls requires an inherent flexibility in the support structures. On the other hand, the provision of the necessary resistance to high shock stresses requires support structures of high strength characteristics and usually results in support structures of excessive stiffness. Superimposed upon these apparently contradictory requirements is the overriding necessity for minimum support structure weight and space requirements. In addition, it must at all times be recognized that the hull members upon which the support structures are in turn supported are not completely rigid, whereby the support structures must, of necessity, have the capacity to accommodate deformation of the said hull members without transmitting such deformation, in the form of high mechanical stresses, to the turbo generator unit, and accordingly adversely affecting the operation of the latter. It is, therefore, a primary object of this invention to provide support structures for rotating machinery in the nature of large turbo generator units for use in naval vessels which minimize the transmission of the operational vibrations of the said rotating machinery to the hull of the said naval vessels while, at the same time, exhibiting strength characteristics of sufficient magnitude to resist the high shock stresses which may be transmitted to the said hull during operation of the said vessel.

Another object of this invention is the provision of support structures as above which are fully capable of accommodating deformation of the vessel hull without transmitting the same to the said rotating machinery in the form of damaging mechanical stresses.

Another object of the invention is the provision of a support structure as above which are of relatively light weight and minimum space requirements.

A further object of the invention is the provision of support structures as above which are of particularly uncomplicated and durable design and construction, and require only the use of readily available components, whereby the costs of fabrication and installation thereof are minimized, and long periods of satisfactory, maintenance-free operation thereof are assured.

In a herein disclosed preferred embodiment, the support structure of the invention is utilized in the mounting of a turbo generator unit for propulsive purposes within a submarine, and comprises means to support the said turbo generator at only the three spaced points necessary to the establishment of a plane. To this effect, a generally U-shape support cradle is provided and comprises generally axially extending support pipes interconnected at corresponding extremities thereof by a generally transversely extending flexure plate. Trunnion means are provided on the stator of the generator and extend therefrom into trunnion housings provided therefor in the said support pipes to permit angular movement therebetween, while attachment means are provided between the turbine and the said flexure plate to constitute the third support point and permit controlled movement of the turbo generator unit in the axial direction due to the inherent flexibility of the said flexure plate. The said support cradle is in turn supported, at four spaced points on the said support pipes, from the ships beams, and vibration isolation mounting means are provided at each of these points to prevent the transmission of operational vibration from the said turbo generator unit to the hull of the submarine. The support structure is so designed that the central plane of said support pipes, i.e. the plane defined by the respective axes thereof, passes through the center of gravity of the said turbo generator to assure maximum resistance to shock stresses with an absolute minimum of weight. Additional vibration isolation means, as for example rubber hose connections, are provided between all essential auxiliary equipment such as the entire lubricating oil supply and cooling system to further insure the prevention of operational vibration transmission.

The above and other objects and advantages of the invention are believed made clear by the following detailed description thereof taken in conjunction with the accompanying drawings wherein:

FIGURE 4 is a top plan view of the ship's beams which are utilized to support the support structure of the invention, and includes therein the depiction of the vibration isolation mounting means of the said support structure;

FIGURE 5 is a vertical cross-sectional view taken along line 5—5 in FIGURE 1; and FIGURE 6 is a vertical cross-sectional view taken along line 6—6 in FIGURE 5.

Figure 1:
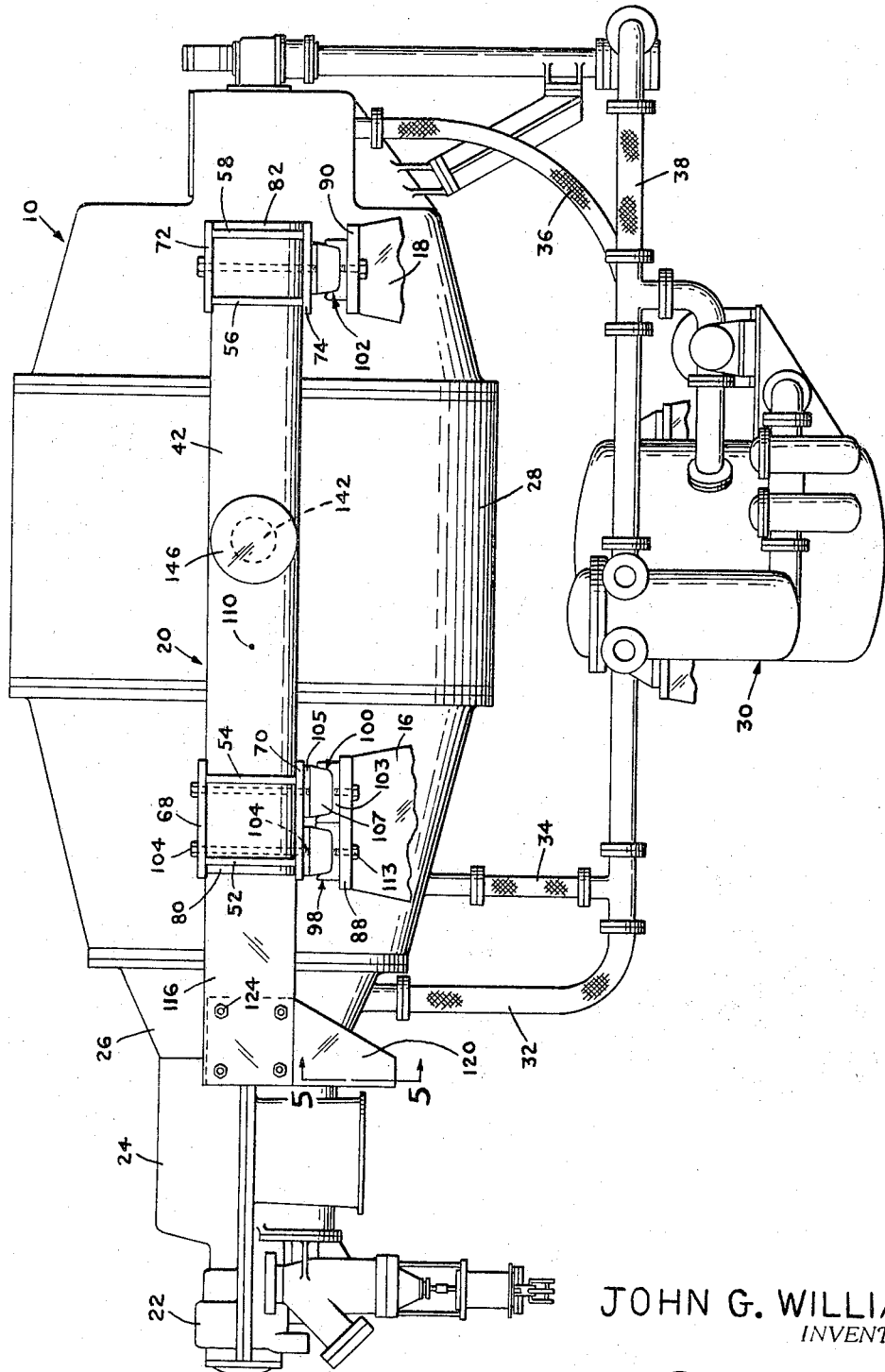
FIGURE 1 is a side elevational view of a turbo generator unit supported within a naval vessel in accordance with the teachings of the invention.
Figure 2:
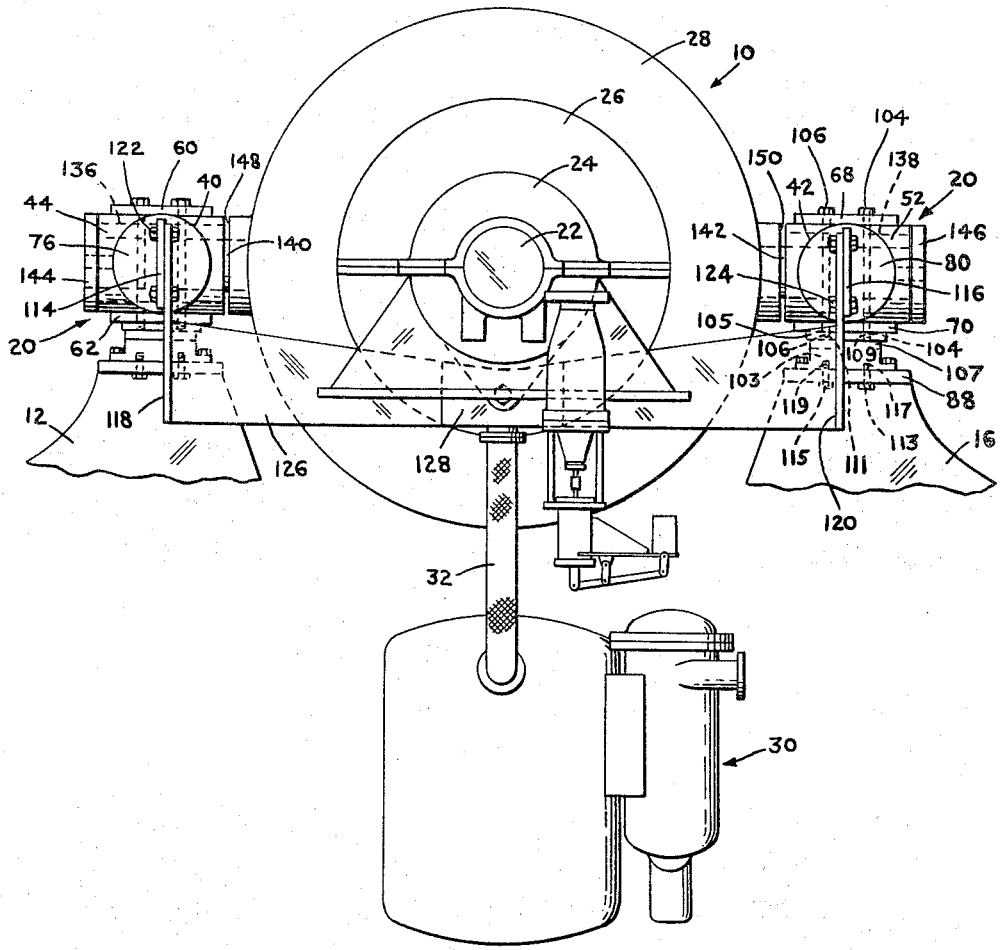
FIGURE 2 is a front elevational view of the turbo generator unit of FIGURE 1.
Figure 3:
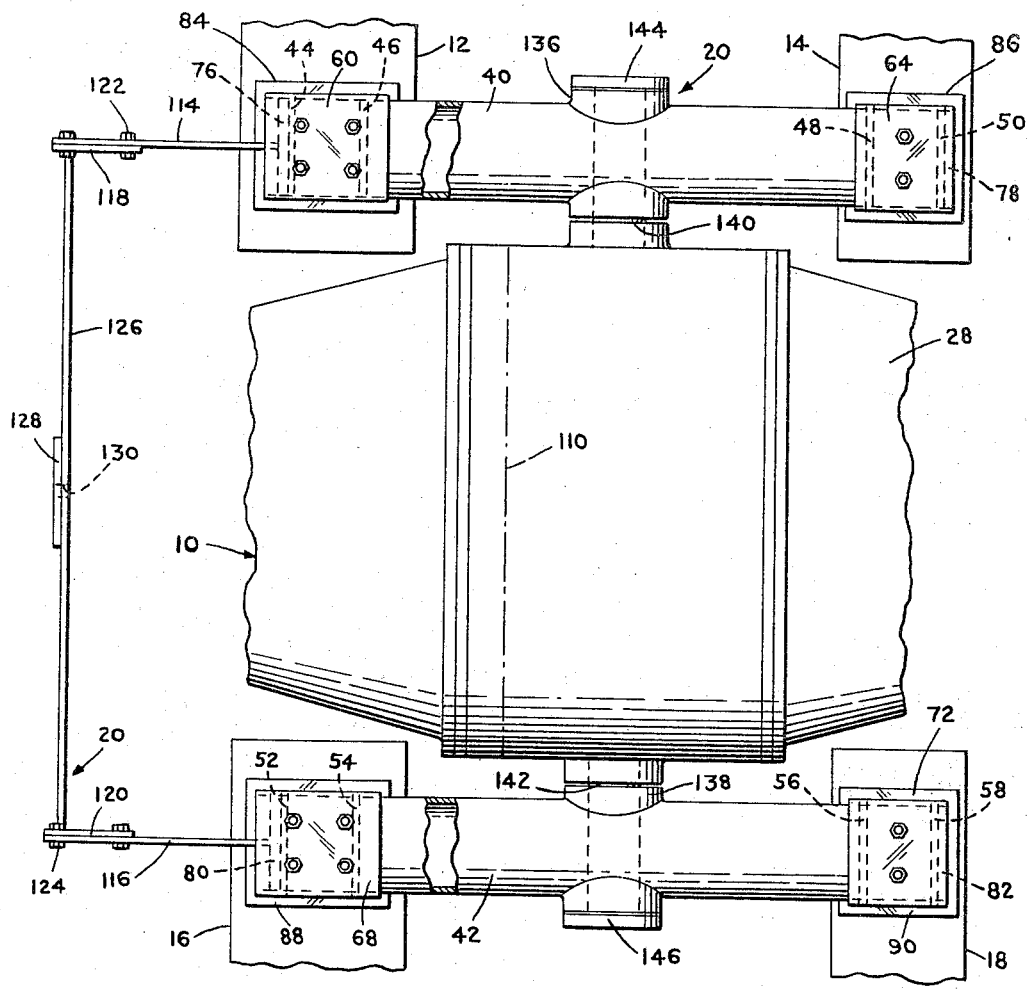
FIGURE 3 is a top plan view of the support structure of the invention.

Referring now to FIGURES 1, 2 and 3, a turbo generator unit is generally indicated at 10. The said turbo generator unit is supported, in a manner described in detail hereinbelow, from four spaced support beams 12, 14, 16 and 18, respectively, by means of a support cradle, as generally indicated at 20, disposed therebetween in the depicted manner.

In the herein disclosed preferred embodiment of my invention, the turbo generator unit 10 may be of the type particularly adaptable to the generation of electricity for the drive of naval vessels, as for example submarines, and comprises a steam generator feed pump 22, a steam turbine 24, a reduction gear assembly 26, and an electric generator 28, relatively disposed as shown. The respective feed pump, steam turbine, reduction gear assembly, and electric generator are preferably joined, at the respective casing junctures thereof, by mating "rabbet" fitted casing attachment flanges of the nature disclosed in detail in my copending application for United States patent, Ser. No. 476,982, filed concurrently herewith, and assigned to the assignee hereof, whereby the structural rigidity of the turbo generator unit 10 is greatly increased and tends to maintain the coaxial alignment of the various components thereof.

A lubricating oil supply system of generally conventional construction is generally indicated at 30, and is connected as shown to the turbo generator unit 10 by rubber hose conduits 32, 34, 36 and 38, respectively, whereby the transmission of vibrational forces from the said turbo generator unit to the said lubricating oil supply system is substantially prevented.

The turbo generator unit support cradle 20 comprises spaced parallel support pipes 40 and 42, respectively, which extends as shown in the depicted generally axial manner along opposite sides of the generator 28. The use of pipes rather than solid support members, provides maximum strength for the said support cradle while substantially reducing the weight thereof. A pair of spaced support plates are provided at each extremity of each of the said support pipes, with the said support plates of each of said pairs being identified as 44 and 46, 48 and 50, 52 and 54, 56 and 58, respectively.

Each of the said support plates includes a bore formed therein through which one of the said support pipes extends, with the support pipe 40 extending through bores provided therefor in the support plates 44, 46, 48 and 50, respectively, and the support pipe 42 extending through bores provided therefor, in the support plates 52, 54, 56 and 58, respectively. The respective support pipes are fixedly secured to the respective support plates in any convenient manner, as for example by welding, at all locations where the said support pipes extend through the said support plates.

A pair of cover plates is secured in any convenient manner, as for example, by welding to the respective upper and lower edges of each pair of support plates to form a box-like support structure at the respective extremities of each of the support pipes 40 and 42. Thus, cover plates 60 and 62 are welded as shown to the respective upper and lower edges of the support plates 44 and 46, cover plates 64 and 66 are welded to the support plates 48 and 50, cover plates 68 and 70 are welded to the support plates 52 and 54, and cover plates 72 and 74 are welded to support plates 56 and 58.

Generally circular end caps 76 and 78 are welded over the respective open ends of the support pipe 40 for support purposes as described in detail hereinbelow, and to seal the interior thereof, and generally circular end caps 80 and 82 are welded over the open ends of support pipe 42 for the same purposes.

Bearing plates 84, 86, 88 and 90, respectively, are provided as shown atop the respective support beams 12, 14, 16 and 18, and may be attached thereto in any convenient manner, as for example, by welding. Similarly constructed vibration isolation mountings of generally conventional rubber-metal construction, as for example those specified as "Standard" by the United States Navy, are identified generally as 92, 94, 96, 98, 100 and 102, respectively, and are disposed on the respective bearing plates in the manner best seen in FIGURE 4. Thus, vibration isolation mountings 92 and 94 are disposed on bearing plate 84, vibration isolation mounting 96 is disposed on bearing plate 86, vibration isolation mountings 98 and 100 are disposed on bearing plate 88, and vibration isolation mounting 102 is disposed on bearing plate 90. Each of the said vibration isolation mountings, as for example vibration isolation mounting 100 (FIGURE 1), comprises a generally U-shaped lower plate 103, a flat upper plate 105, and a rubber, vibration isolation pad 107 extending therebetween and securely bonded thereto to provide an inherently flexible, integral vibration isolation mounting.

Each of the said vibration isolation mountings extends as shown from the bearing plate on which the same is disposed to the cover plate disposed thereover, whereby may be readily understood that the support cradle 20 is in turn supported by the said vibration isolation mountings from the four support beams 12, 14, 16 and 18, respectively.

The center of gravity of the turbo generator unit 10 falls along the dashed line 110 on the generator 28 as seen in FIGURE 3, whereby may be appreciated that a greater portion of the weight of the turbo generator unit 10 is supported from the support beams 12 and 16 than is supported from the support beams 14 and 18. It is for this reason that two vibration isolation mountings are utilized as shown atop each of the former support beams, while only one of the said vibration isolation mountings is utilized atop each of the latter support beams.

The respective upper and lower cover plates disposed at each extremity of the support pipes 40 and 42 are attached to the respective upper plates of each of the vibration isolation mountings disposed immediately therebelow, by two spaced attachment bolts which extend downwardly through the said upper and lower cover plates and through the said support pipes into tapped bores provided therefor in the said upper plates of the vibration isolation mountings; while the respective lower plates of each of the vibration isolation mountings are similarly attached to the respective bearing plates disposed immediately therebelow by two spaced attachment bolts which extend upwardly through the said bearing plates into tapped bores provided therefor in the said lower plates of the vibration isolation mountings.

Thus, for example, with regard to upper and lower cover plates 68 and 70, support pipe 42, upper and lower plates 103 and 105 of vibration isolation mounting 98, and bearing plate 88, all as seen in FIGURES 1, 2 and 4, two spaced attachment bolts 104 and 106 extend respectively through upper cover plate 68, support pipe 42 and lower cover plate 70 into tapped bores 109 and 111 provided therefor in upper plate 105 of vibration isolation mounting 98; while two spaced attachment bolts 113 and 115 extend upwardly through the bearing plate 88 into tapped bores 117 and 119 provided therefor in the lower plate 103 of vibration isolation mounting 98. By this method, the support of the support cradle 20 from the said support beams is assured with the only fixed connection therebetween being the secure bonding between the upper and lower plates, and vibration isolation pads of the respective vibration isolation mountings, whereby the said support cradle is prevented from falling from the said support beams while at the same time being connected thereto only through the said vibration isolation pads to substantially prevent the undesirable transmission of vibration therebtween.

The use of vibration isolation mountings at the locations where the support cradle 20 of the turbo generator unit 10 is supported from the support beams 12, 14, 16 and 18 of a naval vessel, and the use of rubber hoses 32, 34, 36 and 38 at all points of connection between the said turbo generator unit, and the independently supported lubricating oil supply system 30, substantially prevents the transmission of the operation vibrations of the said turbo generator unit to the hull of a naval vessel in which the same may be located. This prevention of the transmission of operational vibrations to the hull of the vessel is of particular importance in applications wherein the turbo generator unit 10 is utilized in the generation of electricity for propulsion of submarines. Under such circumstances, the transmission of these vibrations to the hull of the submarine would greatly increase the possibility of the location and destruction thereof, by conventional underwater sound detection and destruction apparatus, during combat.

An inherently flexible, elongated flat plate 114 is welded to the central portion of the end cap 76 of the support pipe 40 and extends therefrom in the depicted generally axial manner (FIGURE 3), and a similar flat plate 116 is welded to the end cap 80 of support pipe 42 and extends therefrom in a similar manner. Transition plates 118 and 120, respectively, are attached as shown to the respective remote extremities of the flat plates 114 and 116 by respective pluralities of attachment bolts 122 and 124 extending therebetween with the said transition plates extending downwardly from the flat plates in the manner best seen in FIGURES 1 and 2.

A flexure plate 126 extends as shown transversely of the turbo generator unit 10 between the respective flat plates 118 and 120 and is welded thereto at the respective extremities thereof, whereby may be readily understood the manner in which the respective support pipe 40 end cap 76, flat plate 114, transition plate 118, flexure plate 126, transition plate 120, flat plate 116, end cap 80, and support pipe 42, cooperate to form the generally U-shaped support cradle 20.

A reinforcing plate 128 is welded to the central portion of the flexure plate 126, and a bore 130 provided to extend as shown through the said flexure and reinforcing plates. A generally U-shaped support yoke 132 extends downwardly from the lower portion of the casing of the steam turbine 24 around the respective flexure and reinforcing plates in the manner best seen in FIGURE 5 and 6. A bore 134 is formed in the said support yoke in alignment with the bore 130 which extends through the said flexure and reinforcing plates, and an attachment bolt assembly 136 extends as shown through the respective aligned bores 130 and 134 to secure the said support yoke to the said flexure plate and enable the support of the former by the lattetr.

Generally, cylindrical trunnion housings 136 and 138 extend as shown through bores provided therefor in the respective support pipes 40 and 42 and are welded thereto. Trunnions 140 and 142 extend as shown from opposite sides of the generator 28 into the respective trunnion housings, with the said trunnions including trunnion end caps 144 and 146 affixed to the respective remote extremities thereof in any convenient manner. Non-illustrated, self-lubricated bronze bearings may be utilized to rotatably support the said trunnions with the said trunnion housings, or alternatively, bearings which require lubrication may be utilized in lieu thereof and non-illustrated Zerk fittings provided to extend through the respective trunnion housings to enable the lubrication of the said bearings. Slight clearances are provided as indicated at 148 and 150 in FIGURE 2 between the respective trunnions and trunnion housings to enable the thermal expansion of the turbo generator unit 10 relative to the support cradle 20 without the development of undesirable thermal stresses in either of the said turbo generator unit or support cradle as should be obvious. In addition, since the central plane of the respective support pipes 40 and 42 passes through the center of gravity of the turbo generator unit, maximum resistance to shock stresses with an absolute minimum of weight is assured.

Since some relative movement between the support beams 12, 14, 16 and 18 will of necessity occur under demanding operational conditions of the naval vessel in which the same are located, as for example, those imposed by stormy seas, extreme maneuvers, or the shock of a near miss from a depth charge, it may be readily appreciated whereby the structure and function of the support cradle 20 of the invention is ideally suited for accommodating such relative support beam movement without the transmission thereof to the turbo generator 10 in the form of damaging stresses, by supporting the said turbo-generator unit at the three relatively fixed points necessary to the establishment of a plane, and enabling the controlled movement of the said three points relative to the said support beams.

Thus, for example, should the operational condition of the vessel in which the turbo generator unit 10 is mounted result in upward movement of support beams 14 and 16 relative to support beams 12 and 18, this will be readily compensated for by the slight rotation, in opposite directions of the respective support pipes 40 and 42 and trunnion housings 136 and 138, about the respective trunnions 140 and 142, and the necessary twisting of flat plates 114 and 116 and flexing of flexure plate 126, to enable the three points at which the turbo generator unit 10 is supported to remain relatively fixed and thereby prevent the development of damaging stresses in the said turbo generator unit. In addition, the inherent flexibility of flexure plate 126 will, of course, enable the controlled thermal growth of the turbo generator unit 10 upon the commencement of turbo generator operation as the various components thereof come up to operating temperatures.

It will be understood that the invention is not to be limited to the specific construction or arrangement of parts shown but that they may be widely modified within the invention defined by the claims.

What is claimed is:

1. A support structure for machinery which vibrates during operation comprising:
   (a) spaced rigid support means subject to movement relative each other;
   (b) support cradle means comprising,
      (1) spaced support pipe means,
      (2) flexible plate means connected with the corresponding extremities of the support pipe means forming thereby an energy absorbing member,
   (c) a plurality of insulating means;
   (d) at least one of said insulating means disposed between each spaced rigid support means and the support cradle means and further connected at one end to the spaced rigid support means and at the other end to the support cradle means so as to isolate and damp vibrations between the support cradle means and the spaced rigid support means;
   (e) means connected to the spaced support pipe means at a plurality of spaced points so that said means has some degree of freedom for movement relative to the support cradle means, whereby undulations of the rigid support means are not fully transmitted through said means.

2. In a support structure as in claim 1 wherein the means connected to the spaced support pipe means comprise rotatable means; and the flexible plate means includes attaching means thereon so as to facilitate flexing and energy absorption within the support structure.

3. In a support structure of claim 1 wherein the means connected to the spaced support pipe means comprise a pair of spaced in-line trunnion means extending transversely from the interior of the support pipe means.

4. In the combination of a support structure for machinery which vibrates in operation including the machinery to be supported the improvement comprising:
(a) spaced rigid support means subject to movement relative each other;
(b) support cradle means comprising,
(1) spaced support pipe means,
(2) flexible plate means connected to the corresponding extremities of the support pipe means thereby forming an energy absorbing member substantially in the plane defined by the spaced support pipe means,
(c) said support pipe means forming a central plane through which passes the center of gravity of the supported machinery so as to assure maximum resistance to shock stresses;
(d) a plurality of insulating means;
(e) at least one of said insulating means disposed between each spaced rigid support means and the support cradle means connected at one end to the support cradle means so as to vibrationally isolate the support cradle means from the spaced rigid support means;
(f) means for supporting said machinery connected at one end to the spaced support pipe means and connected at the other end to the machinery to be supported at a plurality of spaced points so that said means permits some relative movement between the machinery to be supported and the support cradle means;
(g) attaching means on the flexible plate means for the machinery to be supported, whereby undulations of the rigid support means, not damped by the insulating means, cause movement of the machinery relative its means for support which movement is absorbed through the attaching means by the flexible plate means thereby preventing damage to the supported machinery.

5. In the combination of a support structure for the support of a turbo generator unit including the turbo generator to be supported, the improvement comprising:
(a) spaced rigid support means subject to movement relative each other;
(b) a generally U-shaped support cradle means comprising,
(1) spaced support pipe means substantially horizontal and parallel with each other and the axis of the turbo generator with said pipe means forming sides for the support cradle means;
(2) flat plate means attached to the corresponding extremities of the support pipe means and extending therefrom in a spaced generally axial manner relative the turbo generator,
(3) flexible plate means which are attached to the corresponding extremities of the flat plate means and extend therebetween generally traverse to the axis of the turbo generator unit,
(c) said support pipe means forming a central plane through which passes the center of gravity of the turbo generator so as to assure maximum resistance to shock stresses;
(d) a plurality of insulating means;
(e) said insulating means disposed between each spaced rigid support means and the support cradle means and connected at one end to the rigid support means and connected at the other end to the support cradle means so as to vibrationally isolate the support cradle means from the spaced rigid support means;
(f) pivot support means connected at one end to the spaced support pipe means at a plurality of spaced points and connected at the other end to the turbo generator unit so that the pivot support means permits some relative movement between the turbo generator and the support cradle means;
(g) attaching means on the flexible plate means for attaching the turbo generator unit, whereby undulations of the rigid support means not damped by the insulating means, cause movement of the turbo generator relative the pivot support which movement is absorbed through said attaching means by the flexible plate means thereby preventing damage to the turbo generator.

6. In a structure as in claim 5 wherein the pivot support means comprises trunnion means extended between the support pipe means and the respective sides of the turbo generator unit so as to enable a controlled degree of relative rotation therebetween; and said attaching means is spaced at a point corresponding to the center point of said flexible plate means for attachment of the turbo generator unit.

7. In the combination of a support structure for the support of a turbo generator unit including an axially aligned turbine and generator unit the improvement comprising:
(a) spaced rigid support means subject to movement relative each other;
(b) a support cradle comprising,
(1) first and second spaced support pipes substantially horizontal and parallel with each other extending generally axially with the turbo generator unit on opposite sides thereof,
(2) first and second flat plate means attached at one end to the corresponding extremities of the first and second support pipes and extending therefrom in a spaced generally axial manner relative to the support pipes and the turbo generator unit;
(3) flexible plate means attached to the other end of the first and second flat plate means and extending generally traverse to the axis of the support pipe means and the turbo generator,
(c) said support pipe means forming a central plane through which passes the center of gravity of the turbo generator unit so as to assure maximum resistance to shock stresses;
(d) a plurality of insulating means;
(e) said insulating means disposed between each spaced rigid support means and the support cradle means and connected at one end to the spaced rigid support means and connected at the other end to the support cradle means to as to vibrationally isolate the support cradle means from the spaced rigid support means;
(f) means to support the turbo generator unit from the support cradle at three spaced points with freedom for control relative movement between the turbo generator unit and the support cradle;
(g) pivot support means connected at one end to the support pipe means at least at two spaced points and connected at the other end to opposite sides of the turbo generator unit with said pivot support means forming a part of the means to support the turbo generator unit at three spaced points so that the pivot support means permit some relative movement between the turbo generator unit and the support cradle means;
(h) attaching means on the flexible plate means for the turbo generator unit forming the third support point for the turbo generator unit whereby, undulations of the rigid support means not damped by the insulating means, cause movement of the turbo generator relative the pivot support which movement is absorbed through said attaching means by the flexible plate means thereby preventing damage to the turbo generator.

8. In a support structure as in claim 7 wherein the pivot support means comprise trunnions extending from opposite sides of the turbo generator unit; and trunnion housings for said trunnions in each of the support pipes so as to enable relative rotation between the turbo generator unit and the support cradle.

9. In a support structure as in claim 8 wherein the spaced rigid support means comprise four spaced support means each of which is located generally below the horizontal plane of the support pipes; and first and second box-like support assemblies clamping the respective ends of each support pipe with the lower space of the box-like support assemblies providing the mounting base for the insulating means.

10. In a support structure as in claim 9 the insulating means connected at one end to the rigid support means and at the other end to the box-like support assembly forming thereby the only connection between the rigid support means and the box-like support assembly so as to vibrationally isolate metallic members connected in series.

References Cited

UNITED STATES PATENTS

| | | |
|---|---|---|
| 1,716,132 | 6/1929 | Hodgkinson. |
| 2,475,109 | 7/1949 | Pendleton _____ 248—146 |
| 2,512,487 | 6/1950 | De Lacy _____ 248—19 X |
| 3,164,342 | 1/1965 | Jacobsen _____ 248—3 |
| 3,268,996 | 8/1966 | Luketa _____ 248—19 X |

JOHN PETO, *Primary Examiner.*